United States Patent
Rozenberg et al.

(10) Patent No.: US 11,689,323 B2
(45) Date of Patent: Jun. 27, 2023

(54) EFFICIENT ON-DEMAND PACKET RECOVERY FOR BROADCAST AND MULTICAST NETWORKS SYSTEM AND METHOD

(71) Applicant: Video Flow LTD., Kfar Qasem (IL)

(72) Inventors: Adi Rozenberg, Shoham (IL); Eran Shalev, Ness Ziona (IL); Limor Touriel, Matan (IL)

( * ) Notice: Subject to any disclaimer, the term of this patent is extended or adjusted under 35 U.S.C. 154(b) by 410 days.

(21) Appl. No.: 17/073,468

(22) Filed: Oct. 19, 2020

(65) Prior Publication Data
US 2021/0258106 A1 Aug. 19, 2021

Related U.S. Application Data

(60) Provisional application No. 62/977,309, filed on Feb. 16, 2020.

(51) Int. Cl.
*H04L 1/1829* (2023.01)
*H04L 12/18* (2006.01)

(52) U.S. Cl.
CPC .......... *H04L 1/1835* (2013.01); *H04L 12/18* (2013.01)

(58) Field of Classification Search
None
See application file for complete search history.

(56) References Cited

U.S. PATENT DOCUMENTS

| | | | |
|---|---|---|---|
| 5,870,412 A * | 2/1999 | Schuster | H04L 1/0056 714/752 |
| 6,590,895 B1 * | 7/2003 | Gupta | H04L 1/1809 714/748 |
| 9,577,682 B2 | 2/2017 | Rozenberg | |
| 10,986,387 B1 * | 4/2021 | Parulkar | H04N 21/23439 |
| 2002/0105921 A1 * | 8/2002 | Sawyer | H04W 12/106 370/328 |
| 2002/0144209 A1 * | 10/2002 | Ariel | H03M 13/35 714/792 |
| 2003/0112875 A1 * | 6/2003 | Kondo | H04N 19/98 375/E7.279 |

(Continued)

*Primary Examiner* — Christopher T Wyllie
(74) *Attorney, Agent, or Firm* — Haim M. Factor; 1st-Tech-Ideas.com

(57) ABSTRACT

In a broadcast/multicast IP distribution network for reliable transfer of data/media from at least one transmitter to at least one receiver, the network having a system for generic IP error correction of packets sent in a data/media stream, the system comprising: a probe device configured to send packetized data in the data/media stream to one of a plurality of recovery servers, the probe device associated with the at least one transmitter; a detection device for packet loss detection, the detection device associated with the at least one receiver, the detection device adapted to send a missing packet request to the plurality of recover servers upon detecting a missing packet; and a message communication between the detection device and the plurality of recovery servers, the message communication including packet loss event notification messages with respective messages indicative of at least one missing packet in the data/media stream that did not reach the detection device; wherein the data/media stream is buffered in the plurality of recovery servers, the recovery servers available for a recovery process.

15 Claims, 13 Drawing Sheets

(56) References Cited

U.S. PATENT DOCUMENTS

| | | | | |
|---|---|---|---|---|
| 2005/0021836 | A1* | 1/2005 | Reed | G06F 9/542 |
| | | | | 709/204 |
| 2008/0292281 | A1* | 11/2008 | Pecqueur | H04N 21/8455 |
| | | | | 386/239 |
| 2009/0064248 | A1* | 3/2009 | Kwan | H04L 49/555 |
| | | | | 725/109 |
| 2009/0319824 | A1* | 12/2009 | Liu | H04W 4/06 |
| | | | | 714/E11.078 |
| 2009/0328119 | A1* | 12/2009 | Kan | H04N 7/17318 |
| | | | | 725/107 |
| 2010/0250767 | A1* | 9/2010 | Barreto | H04L 69/16 |
| | | | | 709/233 |
| 2011/0083035 | A1* | 4/2011 | Liu | H04W 4/06 |
| | | | | 714/E11.071 |
| 2014/0189470 | A1* | 7/2014 | Hwang | H04L 1/08 |
| | | | | 714/776 |
| 2016/0149667 | A1* | 5/2016 | Ranatunga | H03M 13/353 |
| | | | | 714/774 |
| 2019/0082335 | A1* | 3/2019 | Yu | H04B 7/0695 |
| 2021/0258106 | A1* | 8/2021 | Rozenberg | H04L 12/1868 |
| 2021/0392176 | A1* | 12/2021 | Rozenberg | H04L 65/611 |
| 2021/0399795 | A1* | 12/2021 | Rozenberg | H04W 76/19 |

\* cited by examiner

EFFICIENT ON-DEMAND PACKET RECOVERY FOR BROADCAST AND MULTICAST NETWORKS SYSTEM AND METHOD

The current patent application claims priority from Provisional Patent Application No. 62/977,309, filed on 20 Feb. 2020.

Embodiments of the present invention relate to systems for generic data and media transmission over broadcast or multicast networks and specifically to an efficient on-demand packet recovery for broadcast and multicast network system and method.

BACKGROUND

Most communication networks use some sort of error recovery techniques to deal with bit error, frame error, or lost packets. Satellite transmission include Reed Solomon or LDPC (low density parity check) error correction techniques, as known in the art; and Raptor codes (RFC6681) are used for mobile communication, as known in the art. These techniques have a limit on the amount of the error recovery that may cause the system operator to reduce bitrate to deal with interference and/or deal with poor reception by the destination clients.

Reference is currently made to FIG. 1, which is a block diagram representing prior art configuration 5 for data/media delivery over an array of media transfer modes, including a broadcast/multicast networks, without two-way error correction. In the figure, a data/media source 10 sends a stream to a conventional packetization and packet distribution unit 12, which then distributes the media stream to the respective media transfer modes, including: satellite links 13; radio/microwave links 14; mobile links 15; and an IP distribution network (broadcast/multicast) 16; as known in the art, to respective receivers: 1, M, N, and P. Atmospheric and other environmental sources of interference are indicated in FIG. 1, related to satellite links 13 and radio/microwave links 14, by the cloud-lightning graphic. As described more in detail hereinbelow, respective receivers may send a data stream/reception with errors and/or interruptions onward to recipients, as indicated schematically by the "X" mark.

Attempts to deal with the problems described hereinabove include redundant information added to each transmitted packet, which increases overhead of the IP stream of the respective links/network. One example is LDPC, Raptor Codes or Reed Solomon—typically applied for mobile networks. The add-on redundant data consumes a constant bitrate of about 25-40% overhead. The major advantage of this technique is that all receivers may recover some lost packets. Recovery is based on the amount of redundant data being added to the original stream. If the interference level is higher than expected following recovery applied, reception is poor, and the recipient experiences a lower quality data stream. Specifically, if an interference level is 10%, but the recovery threshold method only affords up to 5% error recovery, then the received data stream is problematic.

Another technique to deal with the problems described hereinabove is to send redundant data as an additional broadcast or multicast IP stream (such as in IP distribution network 16) running in parallel to the original IP stream. Such a technique is found in the Transport over IP with SMPTE2022-1 protocol, where redundant packets are created by XOR from several packets into a reference packet that is subsequently sent out with the same broadcast or multicast. As with the previously described technique, redundant data overhead represents about 25-30% overhead, with the advantage that all receivers may be able recover some of the missing packets. As noted previously, this technique has a limited recovery level threshold, allowing errors to be passed downstream to the client receivers.

Another technique is ARQ (Acknowledge ReQuest) where each receiver notifies the corresponding sender of a missing packet that was not received, and the sender sends a retransmitted packet to the receiver by broadcast/multicast or unicast. The main advantage in this technique is that retransmitted packets are only sent when there is a loss. Another advantage is that multiple requests may be sent to guaranty successful packet recovery. The main drawback is that if there are 1,000 receivers losing the same packet, they will all be treated with 1,000 retransmitted packets—representing a very large overhead for network planners.

In recent years there has been strong development of unidirectional methods for error recovery, including, for example; LDPC in satellite, Raptor codes in mobile/radio/microwave, and forward error correction in IP delivery. Each error recovery method is uniquely tailored to its link technology, and there has been minimal crossover to create a "hybrid" solution. Each recovery method has a celling limit for the amount of bit error recovery or data recovery to allow it to continue to work without noticeable visual impairment. When the limit is exceeded the link begins to exhibit artifacts and visual impairments that create dissatisfaction by the recipients. For example, a weather front can create interference in satellite service to clients. Forest fires and wind can cause interference to radio signals. Solar flares can cause ionization interruption to most satellite and RF signals. In some harsh cases the service will be completely interrupted, leaving recipients with no service. Recent advancement in IP connectivity proliferation, now allows creation of a novel hybrid solution that can increase the celling level of each medium and can continue to provide uninterrupted service when a primary link suffers interference, a link is down, or it is temporarily disconnected.

Traditional attempts to create a hybrid error correction solution involve constantly sending the same media data across multiple links to create a switching failover between two or more links—for example; satellite data carrying IP packets and the same IP packets being sent over an IP network. Some prior art techniques use peer-to-peer error correction, and recovery servers to act as an ARQ solution for clients to deal with lost packets. This technique consumes a large amount of IP traffic and increases the cost and probability of packet loss on the IP network. As noted hereinabove, prior art techniques used ARQ in multicast or unicast to receiver, so if 1,000 clients lost one unique packet to each client the solution will send 1,000 recovery packets in either unicast or multicast.

There is therefore a need for a generic IP error correction technique to reduce the number error recovery packets sent to a plurality of clients, compared to traditional standards and practices, and to minimize IP traffic as much as possible to realize additional network benefits by freeing up expensive bandwidth.

SUMMARY OF THE INVENTION

According to one aspect of the present invention, a system uses on demand generic packet recovery, wherein one or more recovery packets are calculated and then sent to the network in response to network error reports (also called hereinbelow "error requests") by clients/receivers in data delivery over IP networks.

In data and media transmission, one recovery method is to take multiple retransmission packet requests from multiple receivers and consolidate retransmission into one or more recovery packets sent in broadcast or multicast mode. Error recovery techniques are commonly used in communication systems, but they consume significant bandwidth; either as a constant overhead or in the form of bursts. Embodiments of the present invention include a novel method which reduces recovery overhead significantly for multicast and broadcast networks. The new method improves mobile network communication having multicast capability and satellite distribution networks that distribute IP packets. An additional aspect of the novel method is to provide recovery for any type of data and protocol and of any packet size.

Embodiments of the present invention include means for sorting and calculating one or more consolidated recovery packets in response to a plurality of missing packet reports, the recovery packets are sent in response missing packet notification by a plurality of receivers in real time. The use of generic recovery packet improves the error resilience and the usage of network bandwidth. A corresponding means for calculating a recovery reference packet which may be process by the receiving clients to recovery at its specific lost data packet. The recipient should include means for receive the recovery packet and recalculate back the missing data by running a reverse calculation to using the reference packet.

According to another aspect of the present invention, the system uses the generic reference packet calculation to find the lowest overhead representation to recover one or more receiver missing packet request into a single reference packet. The calculation is done by waiting for a receiver request for a defined time duration, then sorting the request to find the optimal number retransmitted recovery packets Each recovered packet is then calculated by the pulling the requested packets associated with a particular recovery packet and performing a mathematical operation/process (for example XOR) to create a single reference packet so that a reference packet, when sent to multiple clients, may be used to recover one or more different missing packet requests. The ability to reduce the number of packet retransmissions into one single packet reduces a resultant overhead when packets are sent in broadcast or multicast to receivers. Reduction of overhead is critical to bandwidth limited networks, such as mobile and satellite, and embodiments of the current invention afford a significant reduction of this overhead.

According to another aspect of the present invention, the system is applied to encapsulated packets within a tunnel/VPN/or generic protocols for example GSE (RFC5163) or GRE over UDP (RFC8086). The application of the recovery technique on such protocols, allows the application of recovery technique on a plurality of protocols with a common method. Providing a unified and optimized method.

LIST OF DRAWINGS

The invention is described herein, by way of example only, with reference to the accompanying drawings, wherein.

Figure 9A:
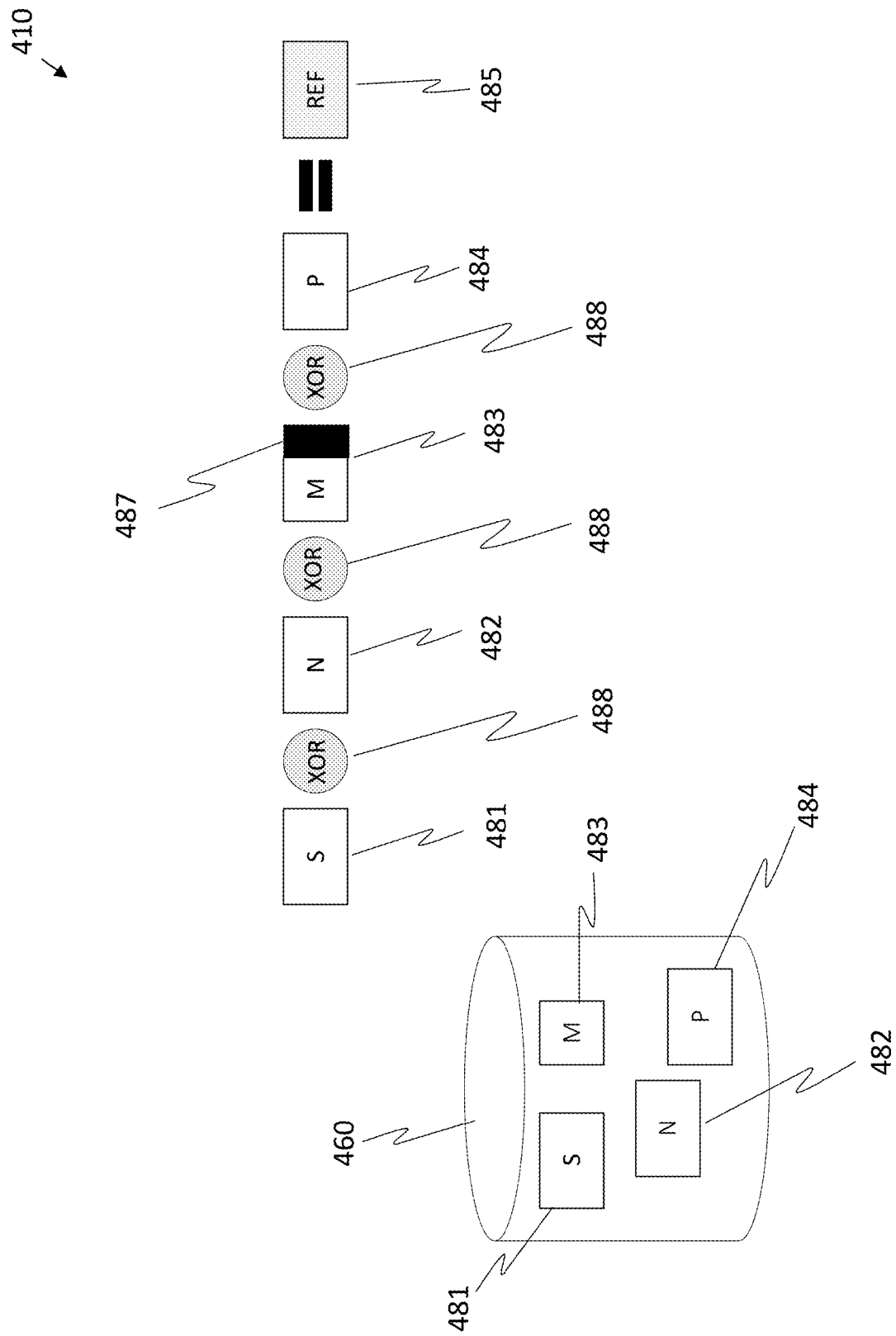
Figure 10:
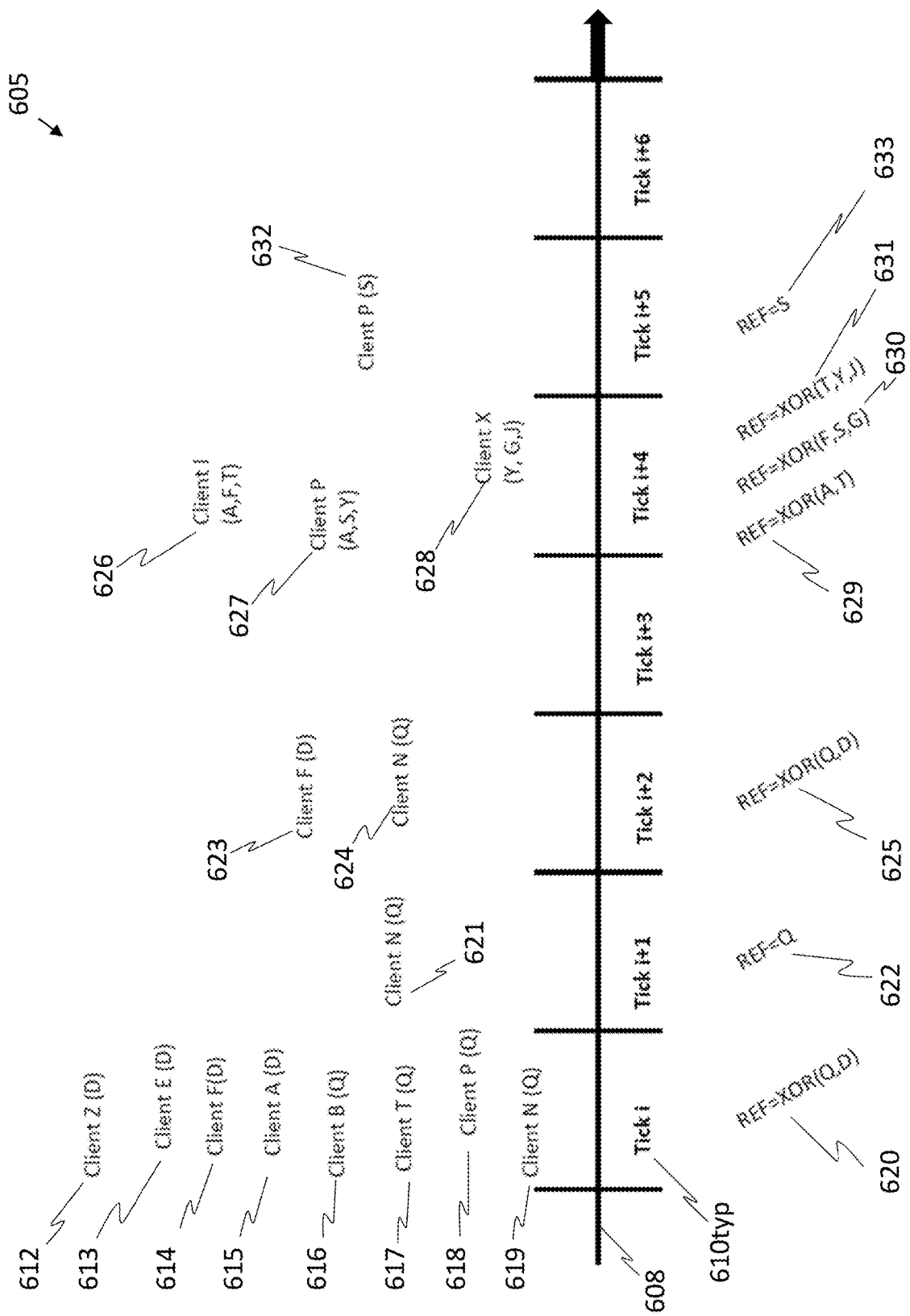
Figure 11:
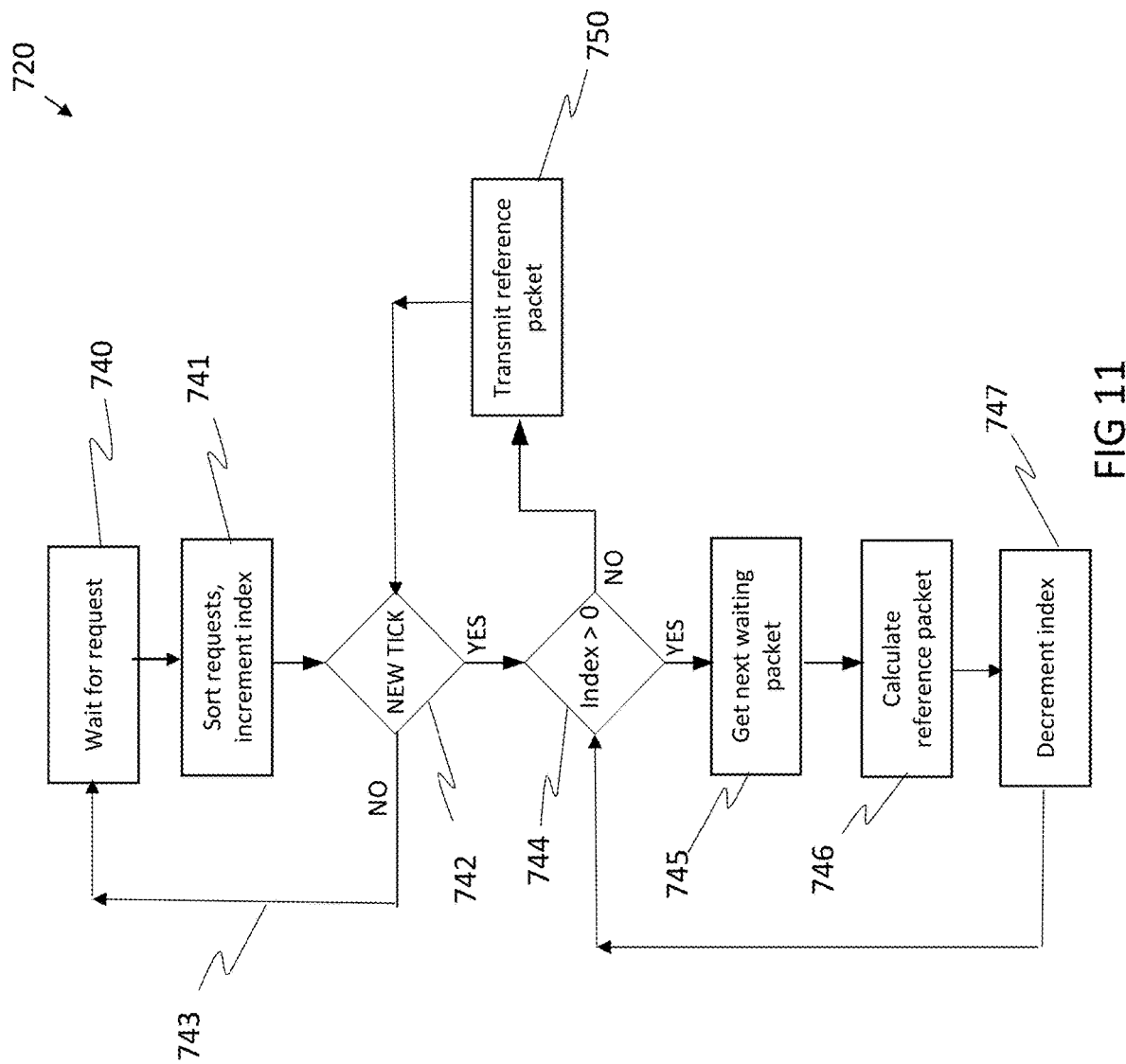
Figure 12:
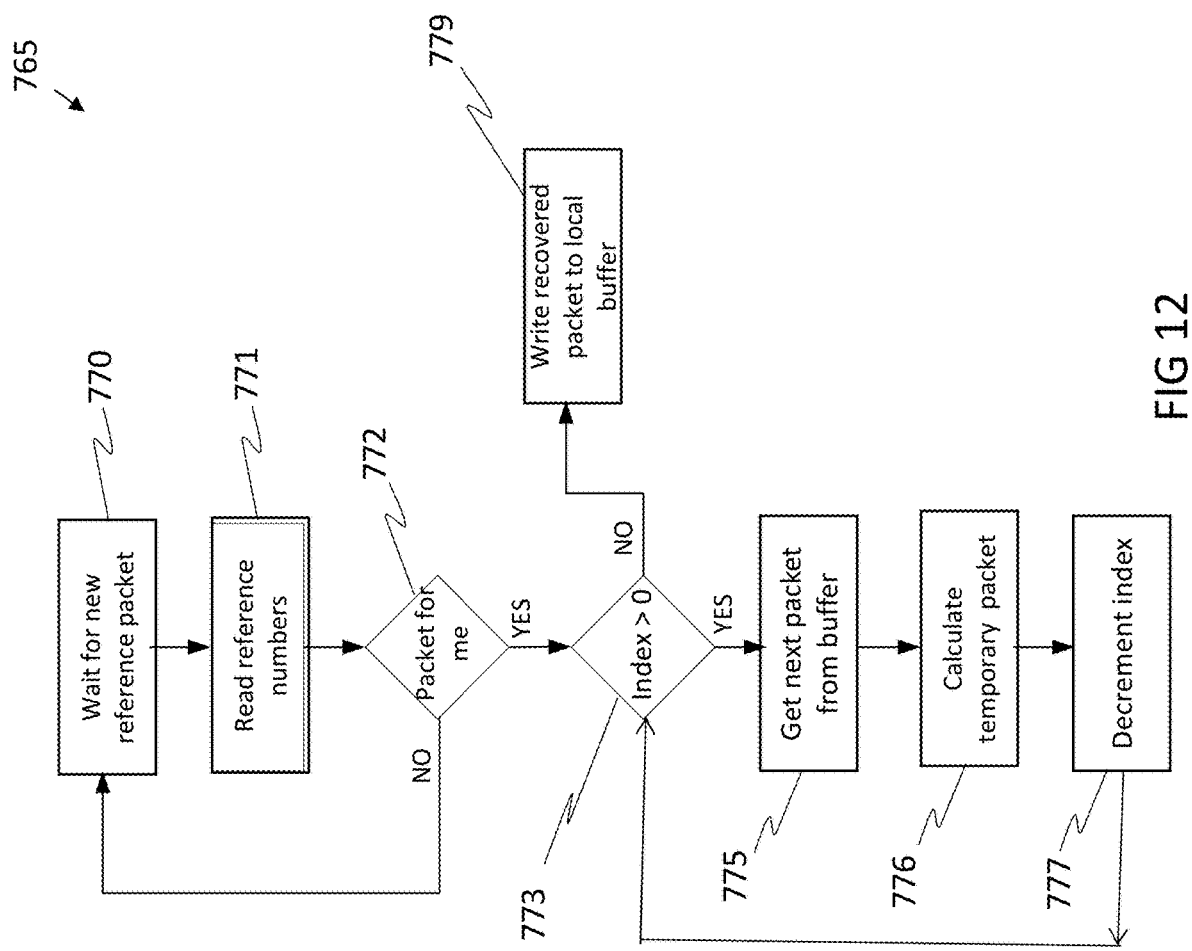

FIGS. 9A and B are schematic diagrams representing processes of encoding and decoding, respectively, in accordance with embodiments of the current invention;

FIG. 10 is an exemplary timeline diagram, schematically illustrating incoming requests versus time tick and respective encoded reference packets computed from the requests, in accordance with embodiments of the current invention;

FIG. 11 is a recovery server request processing/encoding data flow chart, in accordance with embodiments of the current invention; and FIG. 12 is a recovery server request processing/decoding data flow chart, in accordance with embodiments of the current invention.

DETAILED DESCRIPTION OF THE INVENTION

Embodiments of the present invention relate to systems for generic data and media transmission over broadcast or multicast networks and specifically to an efficient on-demand packet recovery for broadcast and multicast network system and method.

In the specification and claims which follow hereinbelow, the following terms are defined hereinbelow.

MPEG transport stream (TS) is a standard format for transmission and storage of audio, video, and Program and System Information Protocol (PSIP) data and is used in broadcast systems such as DVB and ATSC. Transport Stream is specified in MPEG-2 Part 1, Systems (formally known as ISO/IEC standard 13818-1 or ITU-T Rec. H.222.0).

LDPC—a low-density parity-check (LDPC) code is a linear error correcting code, a method of transmitting a message over a noisy transmission channel. An LDPC is constructed using a sparse Tanner graph (subclass of the bipartite graph). LDPC codes are capacity-approaching codes, which means that practical constructions exist that allow the noise threshold to be set very close (or even arbitrarily close on the binary erasure channel) to the theoretical maximum (the Shannon limit) for a symmetric memoryless channel. The noise threshold defines an upper bound for the channel noise, up to which the probability of lost information can be made as small as desired. Using iterative belief propagation techniques, LDPC codes can be decoded in time linear to their block length. LDPC codes are finding increasing use in applications requiring reliable and highly efficient information transfer over bandwidth-constrained or return-channel-constrained links in the presence of corrupting noise. Implementation of LDPC codes has lagged behind that of other codes, notably turbo codes.

Reed-Solomon codes—group of error-correcting codes that were introduced They have many applications, the most prominent of which include consumer technologies such as data transmission technologies such as DSL and WiMAX, broadcast systems such as satellite communications, DVB and ATSC, and storage systems such as RAID 6. Reed-Solomon codes operate on a block of data treated as a set of finite field elements called symbols. Reed-Solomon codes are able to detect and correct multiple symbol errors. By adding t check symbols to the data, a Reed-Solomon code can detect (but not correct) any combination of up to and including t erroneous symbols, OR locate and correct up to and including $\lfloor t/2 \rfloor$ erroneous symbols at unknown locations. As an erasure code, it can correct up to and including t erasures at locations that are known and provided to the algorithm, or it can detect and correct combinations of errors and erasures. Reed-Solomon codes are also suitable as multiple-burst bit-error correcting codes, since a sequence of b+1 consecutive bit errors can affect at most two symbols of size b. The choice of t is up to the designer of the code and may be selected within wide limits.

Raptor codes are the first known class of fountain codes with linear time encoding and decoding. Raptor codes, as with fountain codes in general, encode a given source block of data consisting of a number k of equal size symbols into a potentially limitless sequence of encoding symbols such that reception of any k or more encoding symbols allows the source block to be recovered with some non-zero probability. The probability that the source block can be recovered increases with the number of encoding symbols received above k becoming very close to 1, once the number of received encoding symbols is only very slightly larger than k. For example, with the latest generation of Raptor codes, the RaptorQ codes, the chance of decoding failure when k encoding symbols have been received is less than 1%, and the chance of decoding failure when k+2 encoding symbols have been received is less than one in a million. (See Recovery probability and overhead section below for more discussion on this.) A symbol can be any size, from a single byte to hundreds or thousands of bytes. Raptor codes may be systematic or non-systematic. In the systematic case, the symbols of the original source block, i.e. the source symbols, are included within the set of encoding symbols. An example of a systematic Raptor code is the code defined by the 3rd Generation Partnership Project for use in mobile cellular wireless broadcast and multicast and also used by DVB-H standards for IP datacast to handheld devices (see external links). The Raptor codes in these standards is defined also in IETF RFC 5053. The most advanced version of a practical Raptor code is RaptorQ defined in IETF RFC 6330.

Real-time Transport Protocol (RTP) defines a standardized packet format for delivering audio and video over IP networks. RTP is used extensively in communication and entertainment systems that involve streaming media, such as telephony, video teleconference applications, television services and web-based push-to-talk features. RTP is used in conjunction with the RTP Control Protocol (RTCP). While RTP carries the media streams (e.g., audio and video), RTCP is used to monitor transmission statistics and quality of service (QoS) and aids synchronization of multiple streams. RTP is originated and received on even port numbers and the associated RTCP communication uses the next higher odd port number. RTP was developed by the Audio-Video Transport Working Group of the Internet Engineering Task Force (IETF) and first published in 1996 as RFC 1889, superseded by RFC 3550 in 2003.

User Datagram Protocol (UDP) is one of the core members of the Internet Protocol Suite, the set of network protocols used for the Internet. With UDP, computer applications can send messages, in this case referred to as datagrams, to other hosts on an Internet Protocol (IP) network without requiring prior communications to set up special transmission channels or data paths. UDP uses a simple transmission model without implicit handshaking dialogues for providing reliability, ordering, or data integrity. Thus, UDP provides an unreliable service and datagrams may arrive out of order, appear duplicated, or go missing without notice. UDP assumes that error checking and correction is either not necessary or performed in the application, avoiding the overhead of such processing at the network interface level. Forward Error Correction (FEC)—Technique to recover packet information partial or full, based on calculation made on the information. Such techniques maybe by means of XOR between packets or any other mathematical computation.

SMPTE 2022—The Video services Forum began initial work on a FEC scheme for video transport. That work, added to by the Video Services Forum, was introduced to SMPTE. This proposed standard is known as SMPTE 2022, and it describes both a FEC scheme and a way to transport constant bit rate video over IP networks.

One embodiment of the present invention is to reduce the number error recovery packets sent to a plurality of clients compared to traditional standards and practices, by compacting several recovery packet requests into a single packet. For example, instead of sending 1000 recovery packets as known in the art, only one packet is sent over a multicast network to significantly reduce the network utilization.

Another embodiment of the present innovation is to reduce the IP traffic to a minimum, so that IP traffic is used to provide packet recovery only when needed. Systems using the embodiments of the current invention may be able to reduce error recovery codes used for main broadcast or multicast distribution, freeing expensive bandwidth, as the main recovery solution is performed over the IP network.

Embodiments of the present invention relate to systems for generic data and media transmission over broadcast or multicast networks and specifically to an efficient on-demand packet recovery for broadcast and multicast network system and method. Embodiment of the present invention are related to U.S. Pat. No. 9,577,682 by Adi Rozenberg et al, whose disclosure is incorporated by reference. The current patent application, whose inventors are the same as those of the '682 patent, presents an advancement not taught by the referenced prior art by providing a generic payload recovery technique not limited to one type, and an adaptation for general use for a plurality networks and media.

Embodiments of the current invention include a system having, inter alia, two blocks: a probe device (typically configured in proximity to or as part of data transmission/sending and responsible for recovery processing) and a detector device (configured in or in association with a receiver). As described in detail hereinbelow, the probe device receives incoming data or media stream and stores the packets in a local buffer based on a sequence number that is included in the header information of the packet (for example: RTP sequence number: GRE sequence number: or any sequence number that may be used to insert packets into a buffer and detect a packet loss). The detection device accepts data stream packets and inspects the sequence numbers included in the data header for any lost packets. Packets are then stored temporary to provide buffer elements and to be used for recovery. Upon detection of a lost/missing packet, the detection device signals the probing device about a missing packet, by using a messaging protocol, for example RTCP, common in RTP based systems. (RTCP is noted as an exemplary method for messaging protocol—but any type of messaging protocol may be used between the probe and the detection devices.)

The probe device "listens" to messaging packets having information of missing packets by one or more receivers to calculate an optimal one or more reference recovery packets, based on the missing packet requests. When the reference packet is ready, it is sent out as broadcast, multicast, and optional unicast to receivers. The reference packet includes auxiliary information about the packets that were used in the calculation process of the reference packet. Upon reception of a reference packet the receiver device checks to determine if the reference packet includes its missing packet and the receiver functions to reconstruct the lost packet by running a mathematical reconstruct operation for packet recovery.

Figure 1:
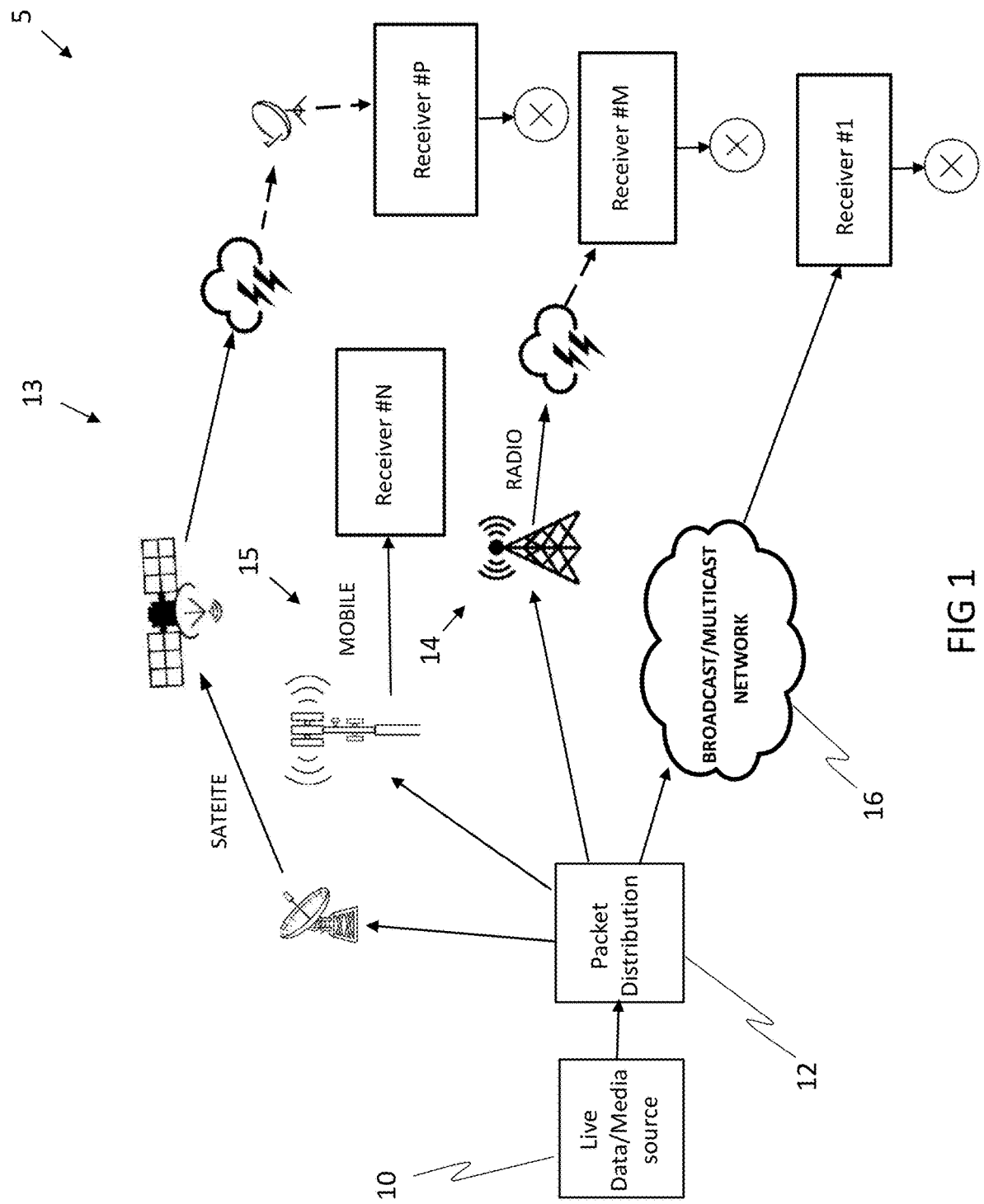
FIG. 1 is a block diagram representing a prior art configuration for IP delivery over a broadcast or multicast networks, using several types of error recovery techniques.
Figure 2:
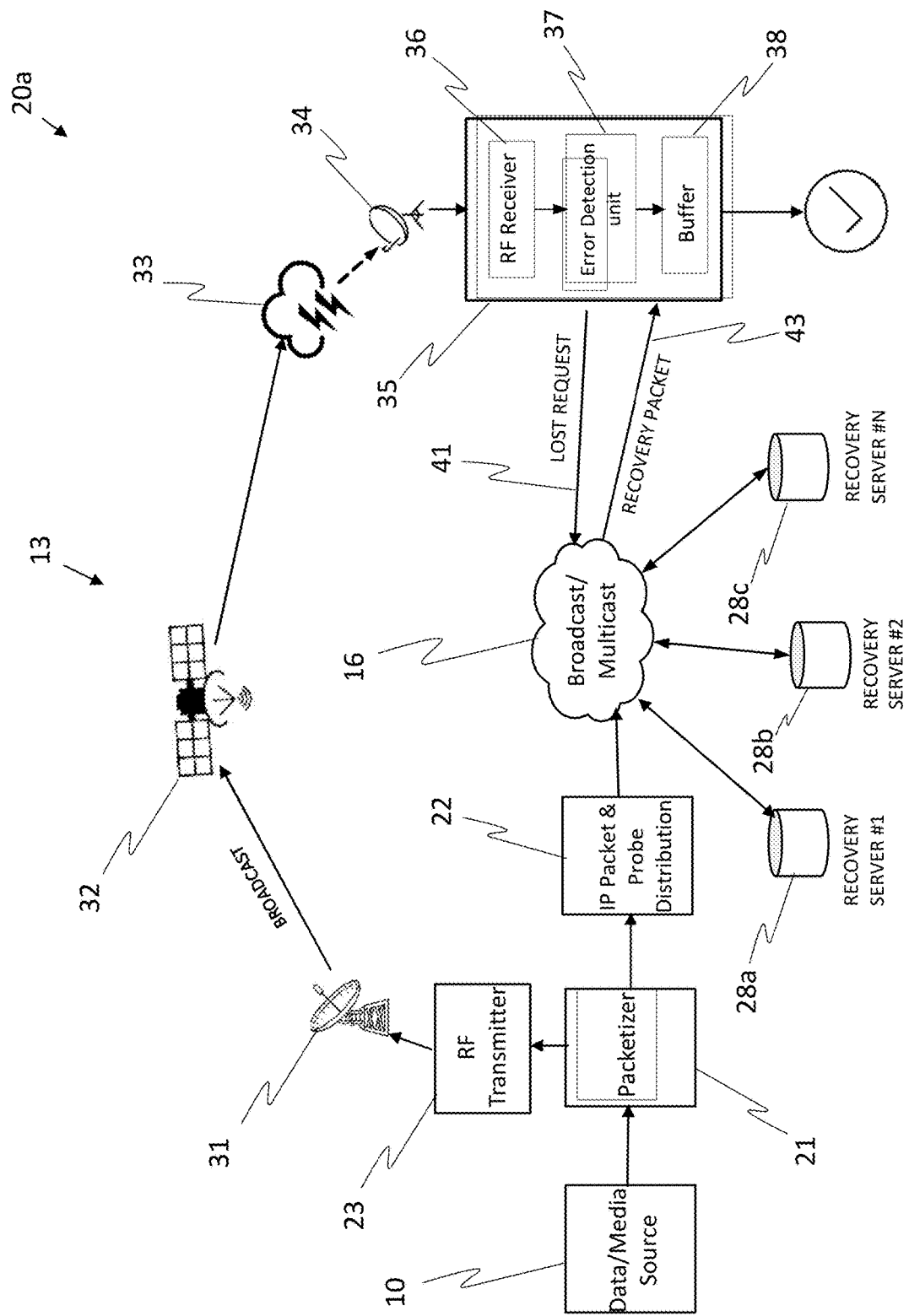
FIG. 2 is a block diagram of a system configured to protect media streaming over satellite and a parallel broadcast/multicast IP distribution network, in accordance with embodiments of the current invention.

Reference is currently made to FIG. 2, which is a block diagram of system 20a configured to protect media streaming over satellite link 13 and parallel broadcast/multicast IP distribution network 16, in accordance with embodiments of the current invention. Apart from differences described below, data/media source 10, satellite link 13, and IP distribution network (broadcast/multicast) 16 of FIG. 1 are identical in notation, configuration, and functionality as described hereinabove. System 20 further includes: a packetizer 21, an IP packet distribution and probe unit 22, an RF transmitter 23, and a plurality of recovery servers no. 1 28a, no. 2 28b, and no. "N" 28c. Satellite links 13 include: a satellite transmitter 31, a satellite 32, atmospheric and other environmental sources of interference 33, an antenna 34, and a receiver device/RF receiver client 35. Receiver device 35 (frequently, although not always, a mobile device) includes: an RF receiver 36, an error detection unit 37 and a buffer 38.

IP packet distribution and probe unit 22 includes all the functionality described hereinabove related to the "probe device", a term used interchangeably with and intended to mean the same as "probe unit" hereinbelow. Error detection unit 37 includes all the functionality described hereinabove regarding the "detection device"—a term used interchangeably with and intended to mean the same as "error detection unit" hereinbelow. The probe device sends packetized data to a plurality of recovery servers using a reliable data delivery protocol. (Streaming over an IP network may use, for example, but not limited to: HTTP, QUIC, RIST, SRT and TCP—all as known in the art). The plurality of recovery servers then buffers the media stream for easy extraction, with respective servers subsequently available for a recovery process. Each data flow is treated individually to allow the use of many different flows simultaneously. A messaging communication exists between the detection device and the recovery server to signal packet loss, status and command information. Messaging is used to send one or more packet loss event notification messages to respective recovery servers, each message indicative of the relevant data/media stream and optionally notifying of one or more packets that did not reach the detector device.

The respective recovery server tunes to a number of detection devices to calculate and encode a recovery reference packet, in accordance with another embodiment of the current invention. The calculated recovery reference packet is sent to all requesting/listening detection devices/clients. Each client then decodes the reference packet and extracts any recovered packet that may be needed. As known in the art in streaming over an IP network, sometimes the same packet may be recovered several times, and is the responsibility of the detection device to ignore duplicated packets. In some cases, the lost packet does not arrive until after a predefined time, during which the detection device may request the lost packet again. (This process is common in streaming over IP ARQ). A detection device may also receive and attempt to decode an out-of-date packet. In such a case the reference packet or the decoded packet is ignored.

System 20a therefore functions/operates as follows:

Live data/media source media sends a stream of data to IP packetizer 21, which forwards data stream traffic destined to RF transmitter 23 and which is then sent over satellite link 13.

IP packetizer 21 also forwards the packet to IP packet distribution and probe unit 22 and the IP packet stream is then forwarded to and IP distribution network (broadcast/multicast) 16. Media stream packets are then forwarded over IP network 16 to plurality of recovery servers no. 1 28a, no. 2 28b, and no. "N" 28c.

The satellite transmission is received by RF receiver 36 of the RF receiver client 35. Received data is checked by error detection unit 37 for erroneous data reception (missing bits, missing frames and similar tests, as known in the art. When sources of interference 33 affect satellite reception (weather, radio interference, solar flares, etc.) reception exhibits bit error loss, bad frames etc. and a user experiences bad viewing and/or data reception.

It is noted that the same communication links noted above also provide control/status information about the health of the stream, clients and source devices.

An important aspect of embodiments of the current invention and part of the error detection process is the recovery of bit errors and bad frames by using IP network 16 and the plurality of recovery servers that store the original stream information. Erroneous data detected in error detection unit 37 is considered to be lost/irrecoverable and is discarded. A lost request 41, requesting a replacement packet, is then sent by to IP distribution network 16 and routed to the respective recovery server designated for respective detection unit 37. The respective recovery server gathers several requests from one or more different packets and encodes the gathered requests into a reference packet/recovery packet 43, sent to one or all listening receiver units 35. Each receiver unit, following receipt of recovery packet 43, proceeds to decode, depending on the encoding method, and to extract one or more needed recovered packets. Recovered packets are transferred to buffer 38 and sent onward to a recipient for a corrected, error-free data stream/reception, as indicated by the schematic "check" mark.

Figure 3:
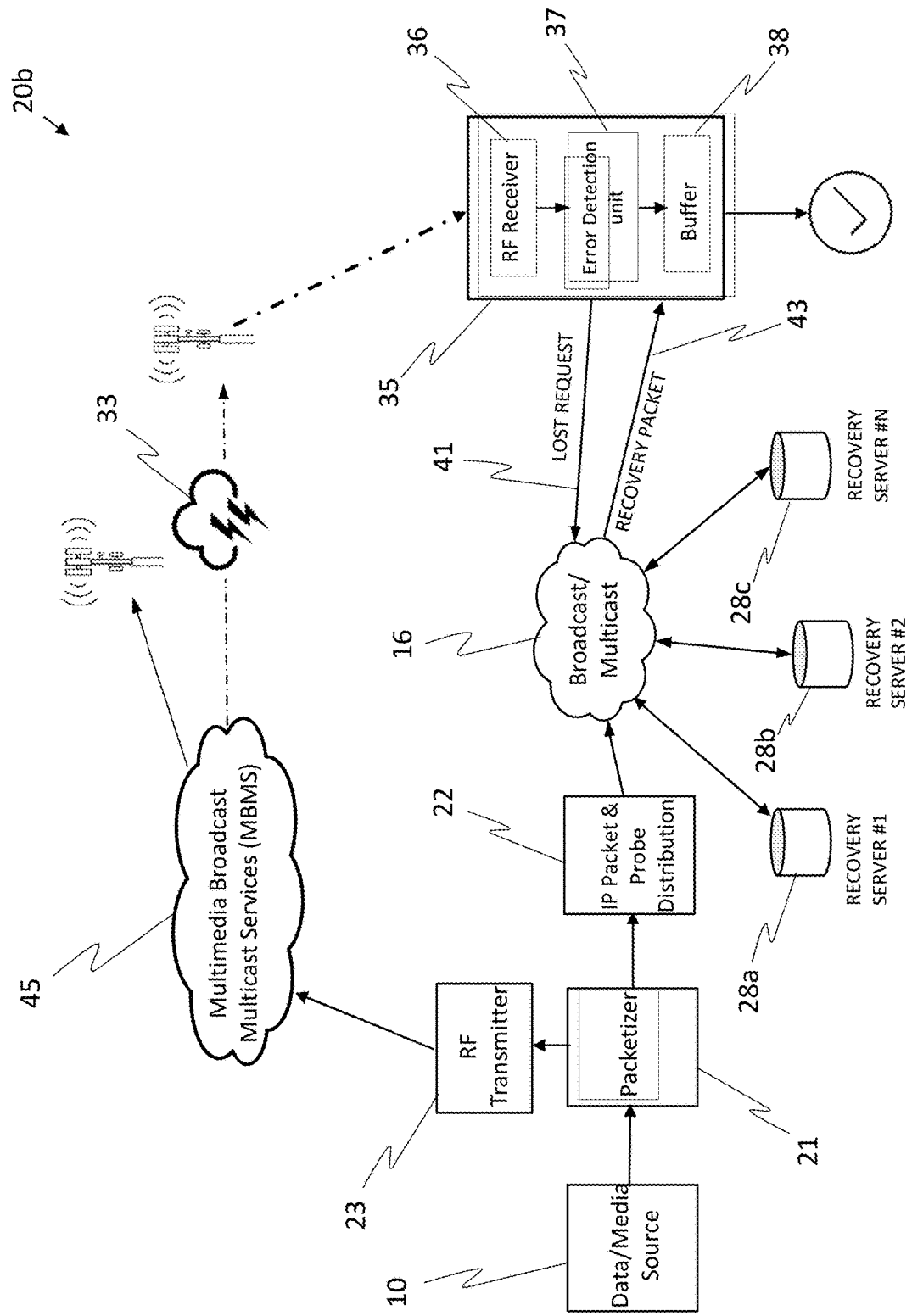
FIG. 3 is a block diagram of a system configured to protect media streaming over a multimedia broadcast multicast services (MBMS) network, typically used for RF data transmissions, as known in the art, and parallel broadcast/multicast IP distribution network, in accordance with embodiments of the current invention.

Reference is currently made to FIG. 3, which is a block diagram of system 20b configured to protect media streaming over a multimedia broadcast multicast services (MBMS) network 45, typically used for RF data transmissions, as known in the art, and parallel broadcast/multicast IP distribution network 16, in accordance with embodiments of the current invention. Apart from differences described below, data/media source 10, RF transmitter 23, IP distribution network (broadcast/multicast) 16, plurality of recover servers 28, sources of interference 33, RF receiver client 35, lost request 41, and recovery packet 43 of FIG. 2 are identical in notation, configuration, and functionality as described hereinabove. System 20b (in the current figure) has MBMS network 45, in place of satellite link 13 of system 20a, shown in FIG. 2.

System 20b functions/operates as follows:

Live data/media source media sends a stream of data to IP packetizer 21, which forwards data stream traffic destined to RF transmitter 23 and which is then sent to MBMS network 45.

IP packetizer 21 also forwards the packet to IP packet distribution and probe unit 22 and the IP packet stream is then forwarded to and IP distribution network (broadcast/multicast) 16. Media stream packets are then forwarded over IP network 16 to the plurality of recovery servers.

The MBMS transmission is received by RF receiver 36 of the RF receiver client 35. Received data is checked by error detection unit 37 for erroneous data reception (missing bits, missing frames and similar tests, as known in the art. When sources of interference 33 affect MBMS reception (weather, radio interference, solar flares, etc.) reception exhibits bit error loss, bad frames etc. and a user experiences bad viewing and/or data reception.

Error correction is affected in system 20b as described hereinabove for system 20a (FIG. 2), mutatis mutandis. Recovered packets are transferred to buffer 38 and sent onward to recipients for a corrected, error-free data stream/reception, as indicated by the schematic "check" mark.

Figure 4:
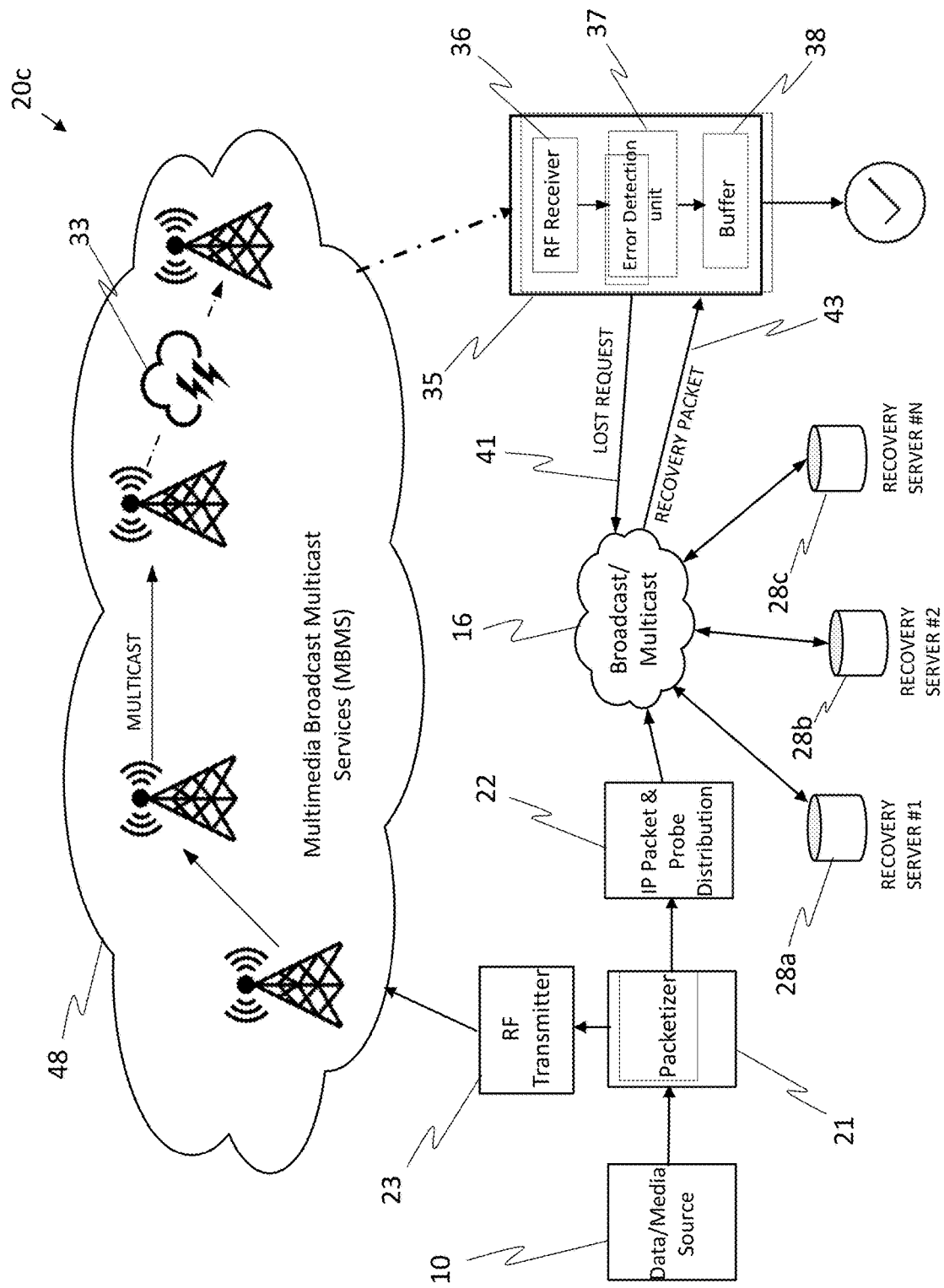
FIG. 4 is a block diagram of a system configured to protect media streaming over a multimedia broadcast multicast services (MBMS) network, typically used in cellular data communications, as known in the art, and parallel broadcast/multicast IP distribution network, in accordance with embodiments of the current invention.

Reference is currently made to FIG. 4, which is a block diagram of system 20c configured to protect media streaming over a multimedia broadcast multicast services (MBMS) network 48, typically used in cellular data communications, as known in the art, and parallel broadcast/multicast IP distribution network 16, in accordance with embodiments of the current invention. Apart from differences described below, data/media source 10, RF transmitter 23, IP distribution network (broadcast/multicast) 16, plurality of recover servers 28, sources of interference 33, RF receiver client 35, lost request 41, and recovery packet 43 of FIG. 3 are identical in notation, configuration, and functionality as described hereinabove. System 20c (in the current figure) has MBMS network 48—directed to cellular communications—in place of MBMS network 45 of system 20b, shown in FIG. 3.

System 20c functions/operates as follows:

Live data/media source media sends a stream of data to IP packetizer 21, which forwards data stream traffic destined to RF transmitter 23 and which is then sent to MBMS network 48.

IP packetizer 21 also forwards the packet to IP packet distribution and probe unit 22 and the IP packet stream is then forwarded to and IP distribution network (broadcast/multicast) 16. Media stream packets are then forwarded over IP network 16 to the plurality of recovery servers.

The cellular MBMS transmission is received by RF receiver 36 of the RF receiver client 35. In this case, RF receiver client 35 is a mobile cellular device, such as but not limited to a cell phone, a tablet, and cellular adapted PC. Received data is checked by error detection unit 37 for erroneous data reception (missing bits, missing frames and similar tests, as known in the art. When sources of interference 33 affect MBMS reception (weather, radio interference, solar flares, etc.) reception exhibits bit error loss, bad frames etc. and a user experiences bad viewing and/or data reception.

Efficient error correction is affected in system 20c as described for systems 20a and 20b (FIGS. 2 and 3, respectively) hereinabove, mutatis mutandis. Recovered packets are transferred to buffer 38 and sent onward to recipients for a corrected, error-free data stream/reception, as indicated by the schematic "check" mark.

Figure 5:
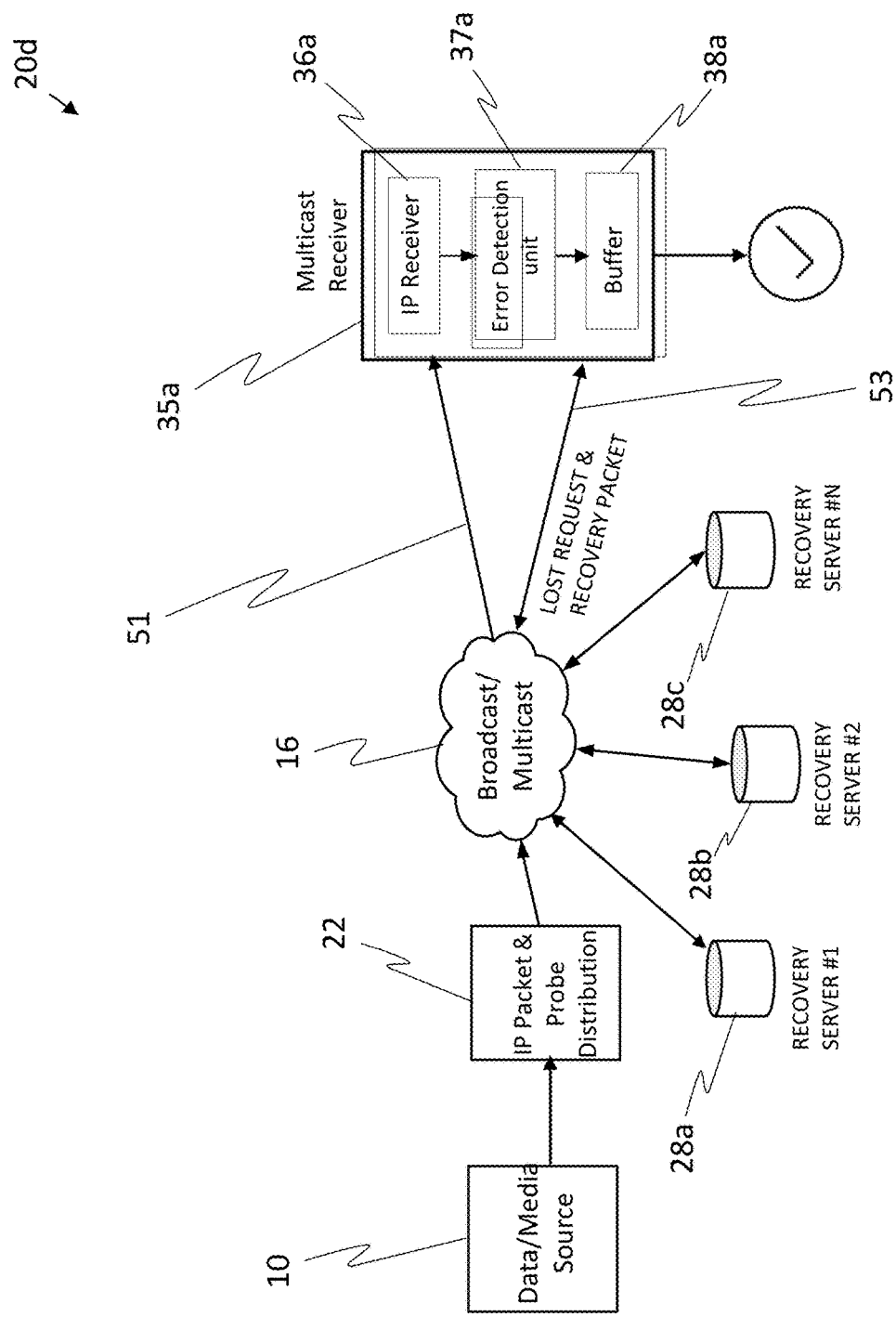
FIG. 5 is a block diagram of a system configured to protect media streaming over a broadcast/multicast IP distribution network, in accordance with embodiments of the current invention.

Reference is currently made to FIG. 5, which is a block diagram of system 20d configured to protect media streaming over a broadcast/multicast IP distribution network 16, in accordance with embodiments of the current invention. Apart from differences described below, data/media source 10, IP distribution network (broadcast/multicast) 16, and plurality of recover servers 28 of FIG. 4 are identical in notation, configuration, and functionality as described hereinabove.

System 20d functions/operates as follows:

Live data/media source media source 10 sends a stream of data to IP packet distribution and probe unit 22 and the IP packet stream is forwarded to IP distribution network (broadcast/multicast) 16. Media stream packets are then forwarded over IP network 16 to the plurality of recovery servers.

The IP network includes a recovery system running on the same or parallel IP network backbone—such as, but not limited to an example where the main distribution is a CDN, known in the art, which performs such a function, and in parallel to an open internet with multicast capability or a VPN with multicast capability.

An IP stream 51 is directed to and received by multicast receiver 35a and specifically by IP receiver 36a in the multicast receiver. When IP stream 51 contains errors (due, inter alia, to: electrical interference and network congestion) the IP stream exhibits stream loss, reception slow down or impairments—as known in the art—and a user experiences bad viewing or bad data reception.

Errors in received IP stream 51 are detected in an error detection unit 37a. Erroneous packets are considered to be lost/irrecoverable and are discarded, and a lost request is sent by bi-directional link 53, requesting a replacement packet, to IP distribution network 16 and is routed to the respective recovery server designated for respective detection unit 37a. The respective recovery server gathers several requests from one or more different packets and encodes the gathered requests into a reference packet/recovery, which is sent to one or all listening multicast receiver units 35a on bi-directional link 53. (This process is similar to that described hereinabove for lost request 41 and recovery packet 43 of FIG. 4.) Each receiver unit, following receipt of the recovery packet, proceeds to decode, depending on the encoding method, and to extract one or more needed recovered packets. Recovered packets are transferred to buffer 38a and transferred to recipients for a corrected, error-free data stream/reception, as indicated schematically by the "check" mark.

Efficient error correction is affected in system 20d similarly as described for systems 20a, 20b, and 20c (FIGS. 2-4) hereinabove, mutatis mutandis. In the current case, recovered packets are transferred to a local buffer 38a and sent onward to recipients for a corrected, error-free data stream/reception, as indicated by the schematic "check" mark. Error detection unit 37a and buffer 38a of the current figure are identical in configuration, and functionality as described hereinabove for error detection unit 37 and buffer 38, respectively, in systems 20a, b and c.

Figure 6:
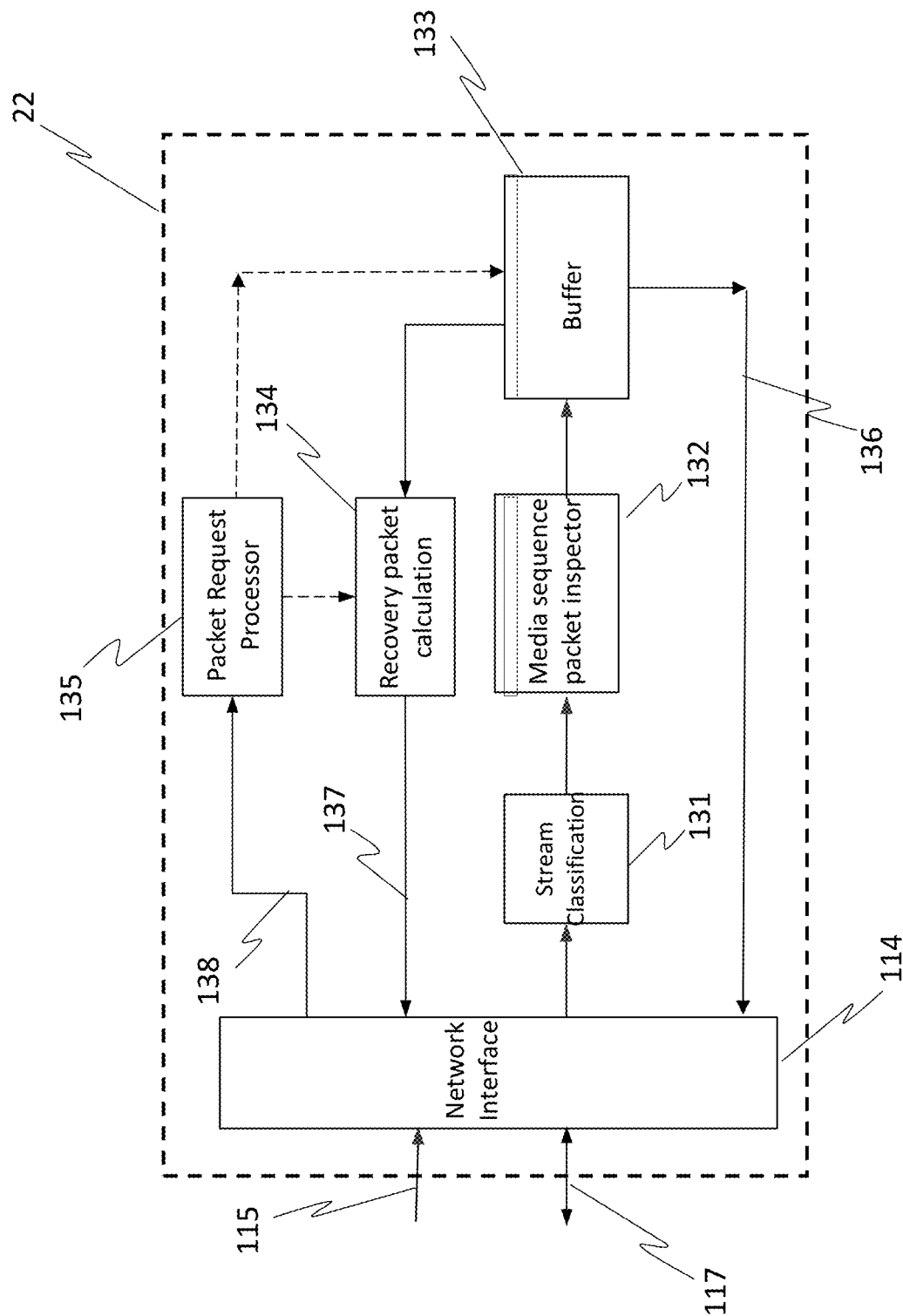
FIG. 6, is a schematic block diagram of the probe device of systems 20a, b, c, d in FIGS. 2, 3, 4, and 5, in accordance with embodiments of the current invention.

Reference is currently made to FIG. 6, which is a schematic block diagram of probe device 22 of systems 20a, b, c, d in FIGS. 2, 3, 4, and 5, in accordance with embodiments of the current invention. The probe device has a network interface 114, which interfaces with an incoming packet stream 115 from a local network (not shown in the current figure). Probe device 22 also has a bi-directional distribution network packet stream 117 to the local network and to plurality of recovery servers 28 (as described hereinabove, ref FIGS. 2, 3, 4, and 5). Probe device 22 further includes: a stream classification block 131; a media sequence packet inspector 132; a local buffer 133; a recovery packet calculation block 134; and a packet request processor 135.

Incoming packet stream 115 enters network interface 114. After processing in probe device 22, packets are sent by bi-directional distribution network packet stream 117 to the plurality of recovery servers 28, as described hereinabove in FIGS. 2, 3, 4, and 5. In parallel packets are stored for temporary storage in local buffer 133, as described hereinbelow.

The incoming packet stream data stream is directed to stream classification block 131, which identifies incoming stream packets, and then transferred to media sequence packet inspector 132, where individual packets are scanned for the respective packet sequence number before being transferred to the local buffer. Processing from stream classification block 131 through the media sequence packet inspector and to the buffer 133 (where media sequence numbers are identified for respective packets) serves to provide temporary data buffering necessary to recover the data stream that is sent to the plurality of recovery servers via bi-directional distribution network packet stream 117. An individual packet sent in the bi-directional distribution network packet stream to the plurality of recovery servers may be lost during transmission en route. It is imperative to ensure reliable packet delivery by bi-directional distribution network packet stream 117 to allow recovery of packets sent over an IP link. This is accomplished as described hereinbelow.

Respective recovery requests are sent by request stream 138 to packet request processor 135. The packet request processor functions by waiting for/accumulating incoming packet recovery requests and by subsequently notifying (as indicated by the dotted line in the current figure) recovery packet calculation block 134 to pull the missing packets from local buffer 133 to be forwarded to the plurality of recover servers in a stream 136. After a predefined time period, older packets are erased from local buffer 133.

Recovery packet calculation block 134 and packet request processor 135 communicate with the plurality of recovery servers (through network interface 114) to retransmit any lost packet to the plurality of recovery servers. Respective recovery servers send respective request notifications over bi-distribution network packet stream 117 through network interface 114. The packet request processor functions by waiting for incoming requests and subsequently notifies recovery packet calculation block 134 to pull the missing packets from local buffer 133 to be forwarded to the plurality of recover servers.

Figure 7:
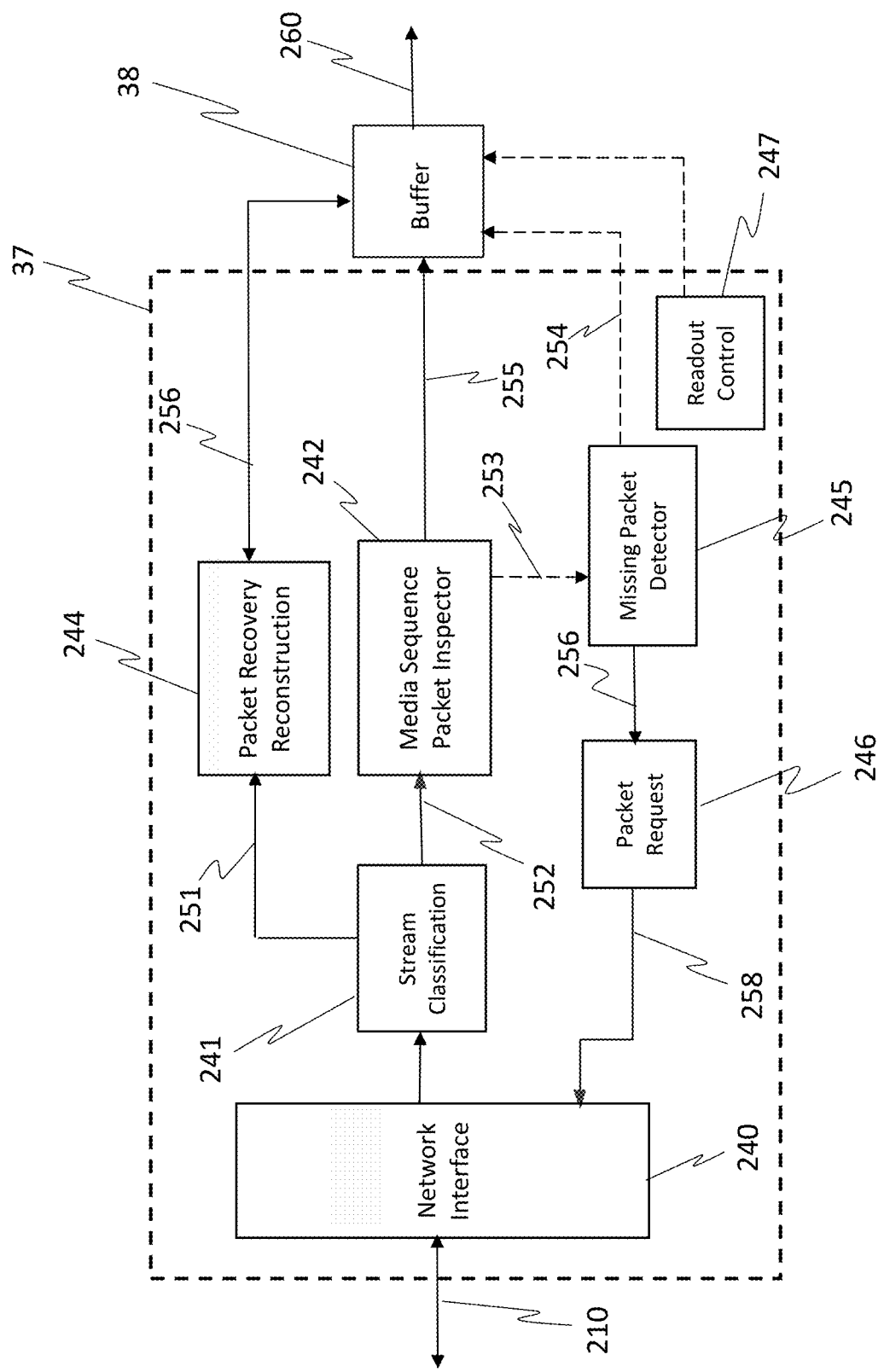
FIG. 7 is a schematic block diagram of the error detection unit of the respective receivers of the systems in FIGS. 2, 3, 4, and 5, in accordance with embodiments of the current invention.

Reference is currently made to FIG. 7, which is a schematic block diagram of error detection unit 37 of the respective receivers of systems 20a, b, c, d in FIGS. 2, 3, 4, and 5, in accordance with embodiments of the current invention. Error detection unit 37 (additionally referred to as "error detection device" and/or "detection device" hereinbelow) includes: an IP network interface 240, receiving from and sending data streams 210 to the network, a stream classification block 241; a media sequence packet inspector 242; a packet recovery calculation/reconstruction block 244; a missing packet detector 245; a packet request processor 246; and a readout control 247.

As part of bidirectional communication 210, an incoming packet stream arrives from IP receiver 36a (FIG. 5) and/or through network interface 240 (in the case of and IP stream) or from RF receiver 36 (FIGS. 2, 3, and 4), mutatis mutandis. The incoming packet stream is initially scanned to identify incoming stream packets by stream classification block 241. Packets are then forwarded to media sequence packet inspector 242 or packet recovery calculation/reconstruction block 244, based on the stream classification block determination. Packets destined to local reception are forwarded via stream 252 to media sequence packet inspector 242. Likewise, recovery packets are forwarded by a stream 251 to packet recovery and reconstruction block 244.

Media sequence packet inspector 242 inspects stream 252 to identify lost media packets and report/notify (indicated by dotted line 253) such occurrences to missing packet detector 245. All other packets are forwarded from the missing packet detector by a stream 254 and also forwarded from media sequence packet inspector 242 by a stream 255 to local buffer 38 (of systems 20a, b, c, d—ref FIGS. 2-5) for temporary storage. Missing packet detector 245 periodically scans stream 253 for the recovery status of previously-lost packets. The missing packet detector sends a stream 256 to packet request block to send a packet request message via stream 258 and through the network interface and by stream 210 to the plurality of recovery servers 28 (of systems 20a, b, c, d—FIGS. 2-5).

Respective recovery servers (of the plurality of recovery servers, ref as FIGS. 2, 3, 4, and 5) then encode respective recovery reference packets and send the respective recovery reference packets over the network in stream 210 back to error detection unit 37. An individual reference packet is forwarded to packet recovery reconstruction block 244 for decoding. If one or more packets are needed by packet recovery reconstruction block 244 (i.e., the packet is marked as "missing") then packet recovery reconstruction 244 initiates a decoding process using the local buffer 38 as a reference through a bidirectional stream 256. During the process, packets are read and processed against the reference packet via bidirectional stream 256 until the target missing packet is recovered. Once recovered, the packet is restored, and it is re-inserted in local buffer 38. Readout control 247 functions to readout packets from buffer 38 to the network via a stream 260. (The dotted line connecting readout control 247 with buffer 38 indicates a command line and not a data stream.)

Figure 8:
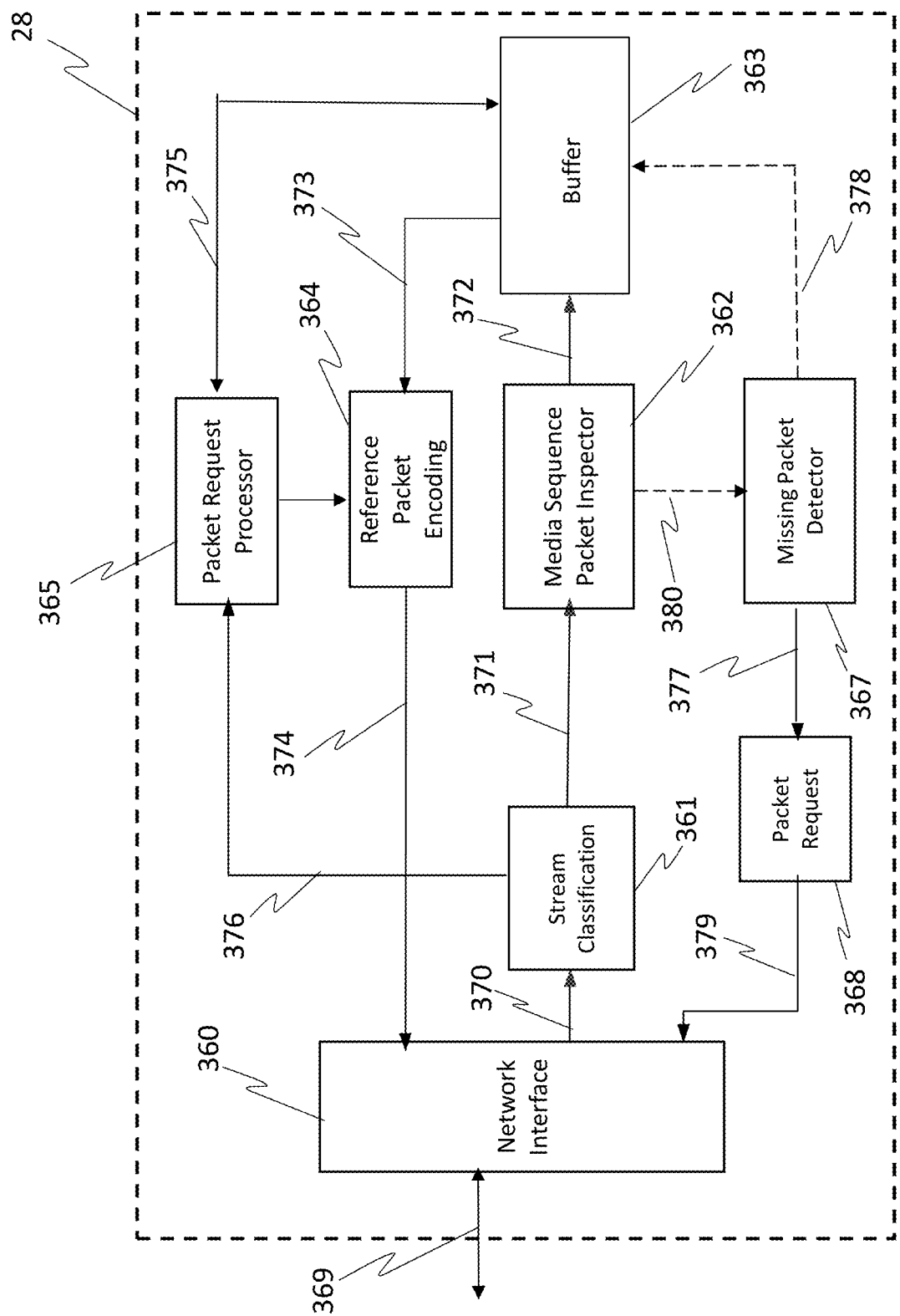
FIG. 8 is a schematic block diagram of an individual recovery server of the plurality of recover servers of the systems in FIGS. 2, 3, 4, and 5, in accordance with embodiments of the current invention.

Reference is currently made to FIG. 8, which is a schematic block diagram of an individual recovery server of the plurality of recover servers 28 of systems 20a, b, c, d in FIGS. 2, 3, 4, and 5, in accordance with embodiments of the current invention. Individual recover server 28 includes: an IP network interface 360; a stream classification block 361; a media sequence packet inspector 362; a local memory buffer 363; a reference packet encoding block 364; a packet request processor 365; a missing packet detector 367; and a packet request block 368.

The recovery server processes error recovery requests from at least one error detection unit 37 (ref FIG. 7) associated to a corresponding recovery server 28. Recovery server 28 performs two distinct operations, through a bidirectional stream 369 to and from the distribution network:
- to receive and locally store original data stream flow sent from an IP network; and
- to respond to the respective error detection unit lost packet requests and to encode a recovery reference packet to be sent to the distribution network to recover lost packets.

IP packets are received from IP packet and probe distribution 22 of systems 20*a, b, c, d* in FIGS. 2, 3, 4, and 5 over IP network in stream 369 and through network interface 360. Data is forwarded by stream 370 to stream classification block 361, which forwards packets to the relevant processing block—either media sequence packet inspector 362 or packet request processor 365, as described hereinbelow. Media sequence packet inspector 362 inspects stream sequence numbers before transferring packets to local memory buffer 363 via a stream 372. Any missing packets are reported in a stream 380 to missing packet detector 367. The missing packet detector, through a stream 377, signals packet request block 368 to issue a request message of missing packets, through a stream 379 to the network interface and to stream 369 to network and to IP packet and probe distribution 22 (of FIGS. 2, 3, 4, and 5).

As stream 374 represents the output from reference packet encoding 364, the output being a recovery packet, which is sent through network interface 360 to the network in stream 369.

Through a control link 378 (indicated by a dotted line), missing packet detector 367 constantly scans local buffer 363 for the arrival of missing packets and the missing packet detector issues a request if missing packets do not arrive. The functionality of missing packet detector 367 is important to ensure that all packets are available for reference packet encoding 364. Reference packet encoding 364 performs error recovery based upon request packet messages arriving from at least one error detection unit 37 (ref FIG. 7) to packet request processor 365. The packet request processor then accumulates one or more request package messages (ie. "requests") and sorts them based on the client error detection unit (ref FIGS. 2, 3, 4, and 5) and by a request sequence number, as further described below, to determine a minimal number of encoded reference packets. Packet request processor 135 has a predefined time value, called a "tick" process waiting requests.

As requests are gathered, optimization of the process increases so that multiple requests of the same lost packet yield only one recovery packet being generated—instead of the recovery packet being sent many times—all as further described hereinbelow.

In a case where a plurality of different requests come from a plurality of different detection units; embodiments of the current invention enable encoding of a single packet into one recovery packet, based on the exemplary assumption that:
- if packets N, M, P, S are each individually reported to be lost by respective detection units A, B, C, D, then:
  - detection unit A did not lose packets M, P, S;
  - detection unit B did not lose Packets N, P, S;
  - detection unit C did not lose Packets N, M, S; and
  - detection unit D did not lose Packet N, M, P.

So, one reference packet may be calculated as REF=Encode (N, M, P, S).

Figure 9B:
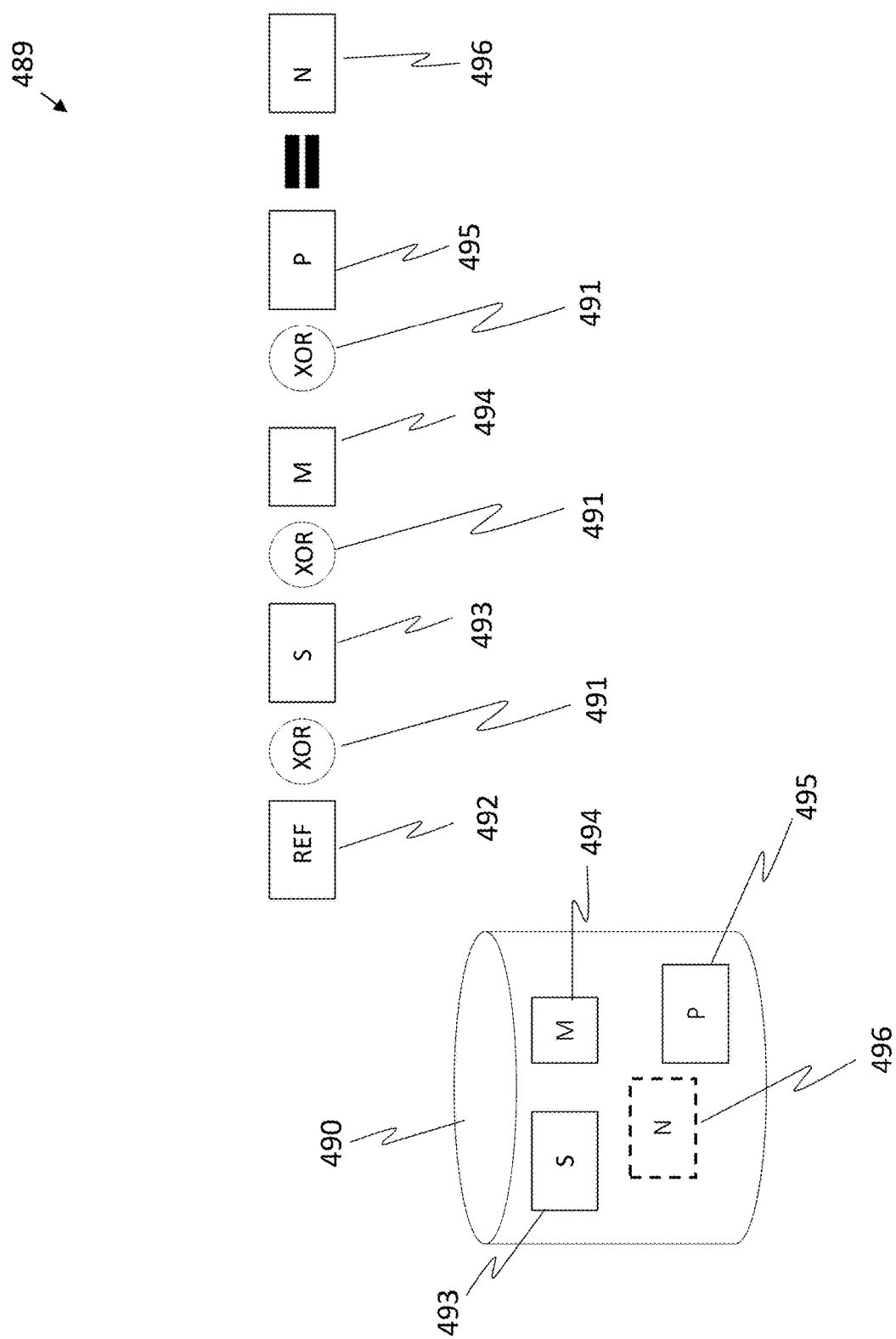

Reference is currently made to FIGS. 9A and 9B, which are schematic diagrams representing processes of encoding 410 and decoding 489, respectively, in accordance with embodiments of the current invention. The encoding process 410 is a mathematical process that has an inverse function, which used by decoding process 489. An embodiment of the current invention allows for many mathematical error correction/coding/decoding techniques to be used, such as, but not limited to: XOR; Raptor codes; and Reed-Solomon—as applied to probe distribution 22 of systems 20*a, b, c, d* in FIGS. 2, 3, 4, and 5.

Every request packet is run through the encoding process until a respective reference packet is obtained. Encoding process 410 serves to add the request sequence number to the packet as an extension, to signal which packets are to be decoded from the reference packet. Short packets may be expanded to a full length by adding packet padding, as known in the art. Encoded packets are subsequently sent via stream 374 sent out the distribution network (ref FIG. 8).

In FIG. 9A, an exemplary XOR encoding function is shown. Packets are read from buffer 460 (equivalent to buffer 363 of FIG. 8). Encoding starts with a request to recover packet REF 485, which is a mathematical result of packets S 481, N 482, M 483, P 484. The encoding process may need to pad XOR 488, which is a generic short packet used to align the packet size to a common size—as known in the art. After all packets 481-484 are processed, REF packet 485 is ready to be sent out to its destination.

In FIG. 9B, an exemplary XOR decoding function is shown. The decoding process starts with arrival of a new REF packet 496. A decoder of decoding process 489 is alerted of one or more sequence numbers used in the encoding process of REF 92. The decoder then starts to readout the packet from buffer 490 (equivalent to buffer 38, ref FIG. 7). Each packet is read from the buffer based on its sequence number: a first packet S 493, followed by a packet M 494 and a packet P 495. The decoded outcome is a packet N 496. N 496 is then transferred to the buffer 491.

Reference is currently made to FIG. 10, which is an exemplary timeline diagram 605, schematically illustrating incoming requests versus time tick and respective encoded reference packets computed from the requests, in accordance with embodiments of the current invention. Timeline diagram 605 includes a timeline 608, which is divided into several Ticks 610, indicated as Tick i, Tick i+1, Tick i+2, . . . , Tick i+6. Diagram 605 additionally includes a plurality of requests (612 through 632) that are received from a plurality of clients (Z, E, F, A . . . ) at various times within various Ticks 610.

Diagram 605 shows that for Tick i, a plurality of requests is received from a plurality of different of clients (612 through 619)—and sorting of requests identifies the plurality of clients for two sequence numbers: Q, D. A reference packet 620 is calculated (using an exemplary XOR for the calculation) as an operation between sequence number Q, D. As known in the art, ARQ calls for 8 retransmission packets for such a case, and in the current example the retransmission packet was reduced to 1.

In Tick i+1, a singular request 621 is received from client N with request for sequence number Q. Sorting of the request identifies a single client request for sequence number Q and a reference packet 622 is calculated as a resend of Q. Similarly, in Tick i+2, several requests are received from a plurality of clients: request 623 being client F having a request for sequence number Q; and request 624 being client N with a request for sequence number Q. Sorting of the requests identifies a plurality of clients for two sequence numbers: Q, D and a reference packet 625 is calculated (using XOR for the calculation) as an operation between Q and D.

In Tick i+3, no request arrives. In Tick i+4, three requests arrive, namely: a request 626, being from client I with a request for sequence number A, F, T; a request 127 from client P for sequence number A, S, Y; and a request 128 from client X with request for sequence number Y, G, J. Sorting of the requests identifies a plurality of clients for two sequence numbers A,T,S,G,Y,J. The optimal encoding determines that three reference packets provide optimal resolution, namely: a reference encoding of A,T, 629; a reference encoding of F,S,G, 630; and a reference encoding of T, Y, J, 631. One skilled in the art recognizes that ARQ calls for 6 retransmission packets for such a case, which in this example, is reduced to 3.

In Tick i+5, one request arrives, namely: a request 632 from client N with a request for sequence number S. Sorting of request 632 identifies a single client request for sequence numbers S, and a reference packet 633 is calculated as a resend of S. Finally, In Tick i+6, no request arrives.

Reference is currently made to FIG. 11, which is a recovery server request processing/encoding data flow chart 720, corresponding to FIG. 9A, in accordance with embodiments of the current invention. Data flow chart 720 includes the following steps:
1. Waiting for a new requests to arrive, step 740
2. Sort new requests based on receiver ID and sequence numbers (with the data base stored in local buffer 460—ref FIG. 9A) and incrementing request index, step 741
3. New Tick?, step 742. If "YES" (a new clock TICK) transfer control to step 744, Index>0. If "NO", then return to step 740 for any new request in the current Tick.
4. If current index>0 ("YES" to step 744), proceed to step 745, get next waiting packet from local sort buffer 460 (ref FIG. 9A) and proceed to step 746, calculate reference packet, packet using the sorted data base stored in buffer 363 (ref FIG. 8).
5. If current index not >0, then continue to step 750, transmit reference packet to temporary store new encoded packets belonging to the current Tick and transmit them. After step 750, return to step 742 to check if there is a new Tick.
6. Continuing after step 746, go to step 746, decrement index, and then return to step 744.

Reference is currently made to FIG. 12, which is a recovery server reference packet processing/decoding data flow chart 765, corresponding to FIG. 9B, in accordance with embodiments of the current invention. Data flow chart 765 includes the following steps:
1. Step 770, wait for a new reference packet to arrive.
2. Then step 771, read new request ID and sequence numbers associated with the reference number, set index=number of reference sequence number.
3. Step 772, packet for me? If "YES": the referenced sequence packet belongs to me [respective decoder]—by comparing the current sequence number to the list of lost sequence packets) then go to step 773. Else, return to step 770 to wait for the next reference packet to arrive.
4. Step 773, index>0, if "YES", start the decoding process by proceeding to step 775. Else, proceed to step 779, write recovered packet to buffer 38 (ref FIG. 7) for subsequent retrieval.
5. Step 775, get next packet from buffer, get the next sequence number from the reference packet and read a packet from buffer 38 (ref FIG. 7). based on the sequence number.
6. Step 776, calculate a temporary packet.
7. Step 777, Decrement index and then return to step 773.

It will be appreciated that the above descriptions are intended only to serve as examples, and that many other embodiments are possible within the scope of the present invention as defined in the appended claims.

The invention claimed is:

1. In a broadcast/multicast IP distribution network for reliable transfer of data/media from at least one transmitter to at least one receiver, the network having a system for generic IP error correction of packets sent in a data/media stream, the system comprising:
   a probe device configured to send packetized data in the data/media stream to one of a plurality of recovery servers using a reliable data delivery protocol, the probe device associated with the at least one transmitter;
   a detection device for packet loss detection, the detection device associated with the at least one receiver, the detection device adapted to send a missing packet request to the plurality of recover servers upon detecting a missing packet; and
   a message communication between the detection device and the plurality of recovery servers, the message communication including packet loss event notification messages with respective messages indicative of at least one missing packet in the data/media stream that did not reach the detection device;
   wherein the data/media stream is buffered in the plurality of recovery servers, the recovery servers available for a recovery process, including packet recovery with mathematical error correction/coding/decoding techniques; and
   wherein the recovery process additionally includes accumulation of a plurality of missing packet requests and encoding of a recovery reference packet sent to the at least one receiver for decoding and packet recovery.

2. The system according to claim 1, wherein the probe device further includes: a probe network interface; a probe stream classification block configured to identify incoming probe stream packets; a probe media sequence packet inspector; a local probe device buffer; a recovery packet calculation block; and a probe packet request processor configured to accumulate packet recovery requests, the packet request processor in communication with the local probe device buffer and with the recovery packet calculation block.

3. The system according to claim 2, wherein the detection device further comprises: a detection device IP network interface; a detection stream classification block configured to identify incoming data/media stream packets; a detection media sequence packet inspector in communication with a detection missing packet detector; a detection packet recovery calculation/reconstruction block; a detection packet recovery/reconstruction block in communication with a receiver buffer; and a readout control in communication with a receiver buffer.

4. The system according to claim 3, wherein the plurality of recovery servers further includes, respectively: a recovery server IP network interface; a recovery stream classification block configured to identify incoming recovery stream packets; a recovery media sequence packet inspector in communication with a recovery missing packet detector and with a recovery local buffer and with a packet request; a reference packet encoding block in communication with the recovery local buffer; a packet request processor; and a recovery packet request processor.

5. The system according to claim 4, wherein the plurality of recovery servers is further configured to receive the data/media stream from the probe device, to recover the at least one missing packet, and to store the data/media stream in the recovery local buffer, and the plurality of recover servers is further configured to receive packet loss event notification messages and to use the data/media stream stored in the recovery local buffer, included in the recovery process.

6. The system, according to claim 4, wherein the at least one receiver is configured to determine, upon receipt of the recovery reference packet, whether the respective missing packet is included in the recovery reference packet, the at least one receiver further configured to reconstruct the respective missing packet, the missing packet sent onward to a recipient for a corrected, error-free data stream/reception.

7. The system, according to claim 1, wherein packet recovery with mathematical error correction/coding/decoding techniques includes at least one chosen from the list including: XOR; Raptor codes; and Reed-Solomon.

8. The system, according to claim 1, where the reliable data delivery protocol includes at least one protocol chosen from the list including: HTTP; QUIC; RIST; SRT; and TCP.

9. The system according to claim 1, wherein the network additionally includes data/media streaming over at least one network chosen from the list including: satellite; multimedia broadcast multicast services (MBMS); RF; and cellular data.

10. In a broadcast/multicast IP distribution network for reliable transfer of data/media from at least one transmitter to at least one receiver, the network having a method for generic IP error correction of packets sent in a data/media stream, the method comprising:
    configuring a probe device to send packetized data in the data/media stream to one of a plurality of recovery servers using a reliable data delivery protocol, the probe device associated with the at least one transmitter;
    associating a detection device with the at least one receiver for packet loss detection, the detection device sending a missing packet request to the plurality of recovery servers upon detecting a missing packet; and
    establishing a message communication between the detection device and the plurality of recovery servers, the message communication including packet loss event notification messages with respective messages indicating at least one packet of the data/media stream that did not reach the detection device;
    whereby the data/media stream is buffered in the plurality of recovery servers, and the recovery servers is available for a recovery process; and
    whereby the recovery process includes gathering and subsequently encoding a plurality of missing packet requests, resulting from a plurality of missing packets, into a recovery reference packet, and sending the recovery reference packet to the at least one receiver for decoding and recovery.

11. The method according to claim 10, whereby the recovery process additionally includes accumulating a plurality of missing packet requests and encoding a recovery reference packet, based upon respective request sequence numbers, the reference packet sent to the at least one receiver for decoding and packet recovery.

12. The method according to claim 10, whereby the at least one receiver determines, upon receipt of the recovery reference packet, whether the respective missing packet is included in the recovery reference packet, and the receiver reconstructs the respective missing packet.

13. In a broadcast/multicast IP distribution network additionally including data/media streaming over satellite, multimedia broadcast multicast services (MBMS), RF, and cellular data, for reliable transfer of data/media from at least one transmitter to at least one receiver, the network having a system for generic IP error correction of packets sent in a data/media stream, the system comprising:
    a probe device configured to send packetized data in the data/media stream to one of a plurality of recovery servers using a reliable data delivery protocol, the probe device associated with the at least one transmitter;
    a detection device for packet loss detection, the detection device associated with the at least one receiver, the detection device adapted to send a missing packet request to the plurality of recovery servers upon detecting a missing packet; and
    a message communication between the detection device and the plurality of recovery servers, the message communication including packet loss event notification messages with respective messages indicative of at least one missing packet in the data/media stream that did not reach the detection device;
    wherein the data/media stream is buffered in the plurality of recovery servers, and the recovery servers available for a recovery process; and
    wherein the recovery process includes gathering and subsequently encoding a plurality of missing packet requests, resulting from a plurality of missing packets, into a recovery reference packet, the recovery reference packet sent to the at least one receiver for decoding and recovery.

14. The system, according to claim 13, wherein the recovery process additionally includes accumulation of a plurality of missing packet requests and encoding of a recovery reference packet sent to the at least one receiver for decoding and packet recovery.

15. The system, according to claim 14, wherein the at least one receiver is configured to determine, upon receipt of a recovery reference packet, whether the respective missing packet is included in the recovery reference packet, with the receiver further configured to reconstruct the respective missing packet.

* * * * *